US011861385B2

(12) United States Patent
Jaber et al.

(10) Patent No.: US 11,861,385 B2
(45) Date of Patent: Jan. 2, 2024

(54) METHOD FOR ELECTRONIC DEVICE VIRTUALIZATION AND MANAGEMENT

(71) Applicant: Snap One, LLC, Salt Lake City, UT (US)

(72) Inventors: Jaber Jaber, Long Beach, CA (US); Simon Liu, Walnut, CA (US); Victor Pak, San Mateo, CA (US); Ricardo A. Guerrero, Huntington Beach, CA (US); Eric S. Park, Lake Forest, CA (US); Mina Farah, Huntington Beach, CA (US); Marc Robert Ilgen, Encinitas, CA (US); Dusan Jankov, Huntington Beach, CA (US)

(*) Notice: Subject to any disclaimer, the term of this patent is extended or adjusted under 35 U.S.C. 154(b) by 0 days.

(21) Appl. No.: 16/784,072

(22) Filed: Feb. 6, 2020

(65) Prior Publication Data

US 2020/0174809 A1 Jun. 4, 2020

Related U.S. Application Data

(62) Division of application No. 14/588,359, filed on Dec. 31, 2014, now Pat. No. 10,628,186.

(Continued)

(51) Int. Cl.
*G06F 9/455* (2018.01)
*G06F 9/445* (2018.01)
(Continued)

(52) U.S. Cl.
CPC .......... *G06F 9/455* (2013.01); *G06F 9/44505* (2013.01); *G06F 9/45558* (2013.01);
(Continued)

(58) Field of Classification Search
CPC .. G06F 9/455; G06F 9/45558; G06F 9/44505; G06F 2009/45595; H04L 67/10; H04L 12/4641; H04W 4/60
(Continued)

(56) References Cited

U.S. PATENT DOCUMENTS 6,477,570 B1  11/2002  Takayama et al.
6,512,520 B1   1/2003  Naka et al.
(Continued)

FOREIGN PATENT DOCUMENTS

CN        104871172 B  * 12/2017  ............ G06F 21/41
WO        2006029940      3/2006
WO  WO-2014058989 A1 *  4/2014  ........... G06F 9/4445

OTHER PUBLICATIONS https://www.windows-noob.com/forums/topic/4428-using-sccm-2012-in-a-lab-part-3-configuring-discovery-and-boundaries/ (Year: 2012).*

(Continued)

*Primary Examiner* — David R Lazaro
*Assistant Examiner* — Berhanu Shitayewoldetadik (57) ABSTRACT

A method for electronic device virtualization and management includes transmitting a signal to a server from a client. The signal is initiated by a user of a user interface of the client. The user interface of the client presents at least two devices to the user, which the user may interact with. The signal may include a power cycling instruction directed to at least one of the devices. When the server receives a communication back from the at least one device, it may send the information to the client, where the user interface may be updated in response to the communication. The devices may be controlled with other instructions, such as scheduling instructions, firmware update instructions, and configuration backup instructions. If a power device is virtualized, it may be controlled on a port-by-port basis.

5 Claims, 7 Drawing Sheets

Related U.S. Application Data (60) Provisional application No. 62/047,631, filed on Sep. 8, 2014.

(51) Int. Cl.

| | | |
|---|---|---|
| *G06F 15/16* | | (2006.01) |
| *H04L 29/08* | | (2006.01) |
| *H04L 15/16* | | (2006.01) |
| *H04W 4/60* | | (2018.01) |
| *H04L 29/06* | | (2006.01) |
| *H04L 12/46* | | (2006.01) |
| *H04L 67/10* | | (2022.01) |

(52) U.S. Cl.
CPC .............. *H04L 67/10* (2013.01); *H04W 4/60* (2018.02); *G06F 2009/45595* (2013.01); *H04L 12/4641* (2013.01)

(58) Field of Classification Search
USPC .................................................. 709/203, 223
See application file for complete search history.

(56) References Cited

U.S. PATENT DOCUMENTS

| | | | |
|---|---|---|---|
| 6,628,764 | B1 | 9/2003 | Petite |
| 6,839,733 | B1* | 1/2005 | Lange ..................... H04L 63/10 |
| | | | 709/202 |
| 6,970,183 | B1 | 11/2005 | Monroe |
| 7,009,980 | B1* | 3/2006 | Cao ..................... H04Q 11/0478 |
| | | | 370/395.54 |
| 7,082,464 | B2 | 7/2006 | Hasan et al. |
| 7,194,512 | B1 | 3/2007 | Creemer et al. |
| 7,664,855 | B1* | 2/2010 | Freed .................. H04L 63/1466 |
| | | | 709/225 |
| 7,689,677 | B2 | 3/2010 | Hickey et al. |
| 7,774,633 | B1 | 8/2010 | Harrenstien et al. |
| 8,045,486 | B2 | 10/2011 | Swan |
| 8,045,488 | B2 | 10/2011 | Swan |
| 8,046,694 | B1 | 10/2011 | Appas et al. |
| 8,117,314 | B2 | 2/2012 | Croft et al. |
| 8,280,955 | B1 | 10/2012 | Tyagi et al. |
| 8,325,720 | B2 | 12/2012 | Gao et al. |
| 8,381,264 | B1 | 2/2013 | Corddry et al. |
| 8,386,593 | B1 | 2/2013 | Gao et al. |
| 8,386,937 | B1 | 2/2013 | Gao et al. |
| 8,412,810 | B1* | 4/2013 | Tompkins ............... H04L 41/00 |
| | | | 709/224 |
| 8,413,144 | B1 | 4/2013 | Manmohan et al. |
| 8,527,800 | B2 | 9/2013 | Zatylny et al. |
| 8,631,397 | B2 | 1/2014 | Brar et al. |
| 8,675,517 | B2 | 3/2014 | Swan |
| 8,954,551 | B2* | 2/2015 | Royt ........................ H04L 67/16 |
| | | | 709/223 |
| 9,032,197 | B1* | 5/2015 | Marr .................... G06F 9/44505 |
| | | | 713/1 |
| 9,032,198 | B1* | 5/2015 | Marr .................... G06F 9/44505 |
| | | | 713/1 |
| 9,172,623 | B1 | 10/2015 | Micali et al. |
| 9,354,896 | B1* | 5/2016 | Yang ..................... G06F 9/4401 |
| 9,355,252 | B1* | 5/2016 | Marr ..................... G06F 21/575 |
| 9,420,396 | B2* | 8/2016 | Oerton .................... H04W 4/00 |
| 11,588,920 | B2* | 2/2023 | Shribman ............. H04L 67/141 |
| 2001/0014839 | A1 | 8/2001 | Belanger et al. |
| 2002/0062454 | A1 | 5/2002 | Fung |
| 2002/0152045 | A1 | 10/2002 | Dowling et al. |
| 2003/0028624 | A1 | 2/2003 | Hasan et al. |
| 2003/0036874 | A1* | 2/2003 | Fuller, III ................ G06F 30/34 |
| | | | 702/123 |
| 2003/0036876 | A1* | 2/2003 | Fuller, III .......... G06Q 30/0601 |
| | | | 702/127 |
| 2003/0128698 | A1* | 7/2003 | Darland ............... H04Q 3/0054 |
| | | | 370/360 |
| 2003/0196136 | A1 | 10/2003 | Haynes et al. |
| 2004/0095897 | A1 | 5/2004 | Vafaei |
| 2004/0205181 | A1 | 10/2004 | Ewing et al. |
| 2005/0081074 | A1 | 4/2005 | Chheda et al. |
| 2005/0091305 | A1* | 4/2005 | Lange ................. H04L 63/1408 |
| | | | 709/202 |
| 2005/0104774 | A1 | 5/2005 | Pande |
| 2005/0108375 | A1* | 5/2005 | Hallak-Stamler ....... G06F 3/067 |
| | | | 709/212 |
| 2005/0120160 | A1 | 6/2005 | Plouffe et al. |
| 2005/0144569 | A1 | 6/2005 | Wilcox et al. |
| 2005/0204167 | A1 | 9/2005 | Conlin et al. |
| 2006/0041580 | A1* | 2/2006 | Ozdemir ............. H04L 67/1097 |
| 2006/0090136 | A1 | 4/2006 | Miller et al. |
| 2006/0098699 | A1 | 5/2006 | Sanchez |
| 2006/0111880 | A1* | 5/2006 | Brown ....................... G06F 8/20 |
| | | | 703/1 |
| 2006/0140290 | A1 | 6/2006 | Li et al. |
| 2006/0190612 | A1 | 8/2006 | Kahol et al. |
| 2006/0202964 | A1 | 9/2006 | Liaw et al. |
| 2006/0224852 | A1* | 10/2006 | Kottomtharayil ..... G06F 3/0605 |
| | | | 711/170 |
| 2006/0259604 | A1 | 11/2006 | Kotchavi et al. |
| 2006/0280150 | A1 | 12/2006 | Jha et al. |
| 2007/0198656 | A1 | 8/2007 | Mazzaferri et al. |
| 2007/0214372 | A1* | 9/2007 | Doyon ................... H04M 19/08 |
| | | | 713/300 |
| 2007/0233877 | A1* | 10/2007 | Qu ......................... H04L 67/563 |
| | | | 709/227 |
| 2007/0243934 | A1 | 10/2007 | Little et al. |
| 2007/0294624 | A1* | 12/2007 | Singh .................... H04N 1/0035 |
| | | | 715/747 |
| 2008/0153591 | A1* | 6/2008 | Deligiannidis .......... G06F 3/011 |
| | | | 463/31 |
| 2008/0201414 | A1 | 8/2008 | Amir Husain et al. |
| 2008/0222375 | A1* | 9/2008 | Kotsovinos ........... G06F 9/5083 |
| | | | 709/230 |
| 2009/0088099 | A1* | 4/2009 | Bristow ...................... H03F 1/02 |
| | | | 455/127.2 |
| 2009/0185500 | A1* | 7/2009 | Mower ..................... H04L 43/50 |
| | | | 370/254 |
| 2009/0235174 | A1* | 9/2009 | Royt ..................... G06F 3/0613 |
| | | | 715/734 |
| 2009/0285120 | A1 | 11/2009 | Swan |
| 2009/0290513 | A1 | 11/2009 | Swan |
| 2009/0296718 | A1 | 12/2009 | Gefflaut et al. |
| 2010/0185741 | A1 | 7/2010 | Lee et al. |
| 2010/0192223 | A1* | 7/2010 | Ismael ................. H04L 63/1441 |
| | | | 726/22 |
| 2010/0201712 | A1* | 8/2010 | Grignani .................. G06F 1/169 |
| | | | 345/660 |
| 2010/0211431 | A1 | 8/2010 | Lutnick et al. |
| 2010/0287362 | A1 | 11/2010 | Matsui |
| 2011/0022812 | A1 | 1/2011 | van Der Linden et al. |
| 2011/0071003 | A1 | 3/2011 | Watterson et al. |
| 2011/0072289 | A1 | 3/2011 | Kato |
| 2011/0081857 | A1* | 4/2011 | Lee ........................ H04B 5/0037 |
| | | | 455/41.1 |
| 2011/0085560 | A1 | 4/2011 | Chawla et al. |
| 2011/0113219 | A1* | 5/2011 | Golshan .............. G06F 9/44505 |
| | | | 710/316 |
| 2011/0126110 | A1 | 5/2011 | Vilke et al. |
| 2011/0202380 | A1 | 8/2011 | Vera et al. |
| 2011/0202921 | A1 | 8/2011 | Matsui |
| 2011/0219254 | A1 | 9/2011 | Zatylny et al. |
| 2011/0236024 | A1 | 9/2011 | Mao |
| 2012/0023531 | A1 | 1/2012 | Meuninck et al. |
| 2012/0040611 | A1 | 2/2012 | Griffin et al. |
| 2012/0084381 | A1* | 4/2012 | Alladi ....................... G06F 8/60 |
| | | | 718/1 |
| 2012/0151070 | A1* | 6/2012 | Li ............................ H04L 67/59 |
| | | | 709/227 |
| 2012/0159514 | A1 | 6/2012 | Sigalov et al. |
| 2012/0209581 | A1 | 8/2012 | Gao et al. |
| 2012/0239729 | A1 | 9/2012 | Hefter |
| 2012/0254353 | A1* | 10/2012 | Baba .................... H04L 12/4641 |
| | | | 709/217 |
| 2012/0297382 | A1 | 11/2012 | Kim et al. |

(56) References Cited

U.S. PATENT DOCUMENTS

| | | |
|---|---|---|
| 2012/0311575 A1 | 12/2012 | Song |
| 2012/0316458 A1 | 12/2012 | Rahman et al. |
| 2013/0014126 A1* | 1/2013 | Zana .................. G06F 9/54 |
| | | 719/313 |
| 2013/0014255 A1* | 1/2013 | Chen .................. H04L 63/20 |
| | | 726/22 |
| 2013/0120112 A1 | 5/2013 | Zhao |
| 2013/0138726 A1 | 5/2013 | Shin et al. |
| 2013/0151685 A1 | 6/2013 | Bursell |
| 2013/0159864 A1 | 6/2013 | Smith et al. |
| 2013/0159881 A1 | 6/2013 | Liu et al. |
| 2013/0160002 A1 | 6/2013 | Graham et al. |
| 2013/0169546 A1* | 7/2013 | Thomas ............. G06F 3/04883 |
| | | 345/173 |
| 2013/0173807 A1 | 7/2013 | De Groot |
| 2013/0198744 A1 | 8/2013 | Zimmerman et al. |
| 2013/0201316 A1 | 8/2013 | Binder et al. |
| 2013/0227136 A1 | 8/2013 | Sturgeon et al. |
| 2013/0238795 A1 | 9/2013 | Geffin et al. |
| 2013/0241287 A1 | 9/2013 | Hui |
| 2013/0246816 A1 | 9/2013 | Hsieh et al. |
| 2013/0278226 A1 | 10/2013 | Cong et al. |
| 2013/0282445 A1 | 10/2013 | Chussil |
| 2013/0339433 A1 | 12/2013 | Li et al. |
| 2014/0064283 A1 | 3/2014 | Balus et al. |
| 2014/0115025 A1* | 4/2014 | Taoka .................. H04L 67/10 |
| | | 709/201 |
| 2014/0122729 A1* | 5/2014 | Hon .................. H04N 1/00244 |
| | | 709/228 |
| 2014/0123133 A1 | 5/2014 | Luxenberg |
| 2014/0125483 A1 | 5/2014 | Kane et al. |
| 2014/0126418 A1 | 5/2014 | Brendel et al. |
| 2014/0140233 A1* | 5/2014 | Houston ............. H04L 67/12 |
| | | 370/252 |
| 2014/0181819 A1* | 6/2014 | Mickens ............. G06F 21/74 |
| | | 718/100 |
| 2014/0192710 A1 | 7/2014 | Charette et al. |
| 2014/0201340 A1* | 7/2014 | Barnhill ............. H04L 12/2809 |
| | | 709/220 |
| 2014/0208133 A1 | 7/2014 | Gopal et al. |
| 2014/0239733 A1 | 8/2014 | Mach et al. |
| 2014/0245003 A1 | 8/2014 | Barker |
| 2014/0263612 A1* | 9/2014 | Warren ............. G06K 7/1413 |
| | | 235/375 |
| 2014/0280920 A1 | 9/2014 | Foley et al. |
| 2014/0358984 A1* | 12/2014 | Dalmau ............. H04L 43/12 |
| | | 709/201 |
| 2014/0359494 A1* | 12/2014 | Clark ............. G06F 3/1415 |
| | | 715/762 |
| 2014/0368601 A1* | 12/2014 | deCharms ............. H04N 7/148 |
| | | 348/14.02 |
| 2015/0236913 A1 | 8/2015 | Nakano et al. |
| 2015/0309831 A1* | 10/2015 | Powers ............. G06F 11/1474 |
| | | 718/1 |
| 2015/0326939 A1* | 11/2015 | Dieselberg ............. H04N 21/643 |
| | | 725/109 |
| 2016/0072924 A1* | 3/2016 | Jaber ............. G06F 9/44505 |
| | | 709/203 |
| 2016/0233781 A1* | 8/2016 | Freeman ............. H02M 7/48 |
| 2016/0301791 A1* | 10/2016 | Kim ............. G06F 1/1626 |
| 2016/0328333 A1 | 11/2016 | Dong et al. |
| 2016/0352588 A1* | 12/2016 | Subbarayan ............. H04L 45/58 |
| 2018/0309617 A1* | 10/2018 | Xiao ............. H04L 41/40 |
| 2020/0082402 A1* | 3/2020 | Patel ............. G06Q 20/401 |
| 2023/0039521 A1* | 2/2023 | He ............. H04L 1/0045 |

OTHER PUBLICATIONS https://4sysops.com/archives/sccm-2012-right-click-tools-part-2-features/ (Year: 2012).* https://techgenix.com/introduction-to-configuration-manager-2012-part3/ (Year: 2012).*

Restriction Requirement Response, U.S. Appl. No. 14/588,359 dated Dec. 9, 2016.

Office Action issued for U.S. Appl. No. 14/588,359 dated Feb. 17, 2017.

Office Action issued for U.S. Appl. No. 14/588,359 dated Sep. 25, 2017.

Office Action issued for U.S. Appl. No. 14/588,359 dated Jun. 15, 2018.

Office Action issued for U.S. Appl. No. 14/588,359 dated Jan. 14, 2019.

Notice of Allowance issued for U.S. Appl. No. 14/588,359 dated Dec. 11, 2019.

* cited by examiner

METHOD FOR ELECTRONIC DEVICE VIRTUALIZATION AND MANAGEMENT

CROSS-REFERENCE TO RELATED PATENT APPLICATIONS

This application is a divisional of U.S. patent application Ser. No. 14/588,359, entitled "METHOD FOR ELECTRONIC DEVICE VIRTUALIZATION AND MANAGEMENT," filed Dec. 31, 2014, which is related to and claims priority from U.S. Provisional Patent Application No. 62/047,631, entitled, "SYSTEM AND METHOD FOR POWER DEVICE VIRTUALIZATION AND MANAGEMENT," filed Sep. 8, 2014, which are incorporated herein by reference in their entirety.

BRIEF DESCRIPTION OF THE DRAWINGS

Exemplary embodiments are described herein with reference to the following Figures, wherein.

DETAILED DESCRIPTION

According to certain embodiments, a cloud management system may be set up using a client to display a user interface and enable user interaction, an external proxy to proxy communications within the system, a patroller in communication with a server and with networked devices, a server to facilitate communication between the client and the patroller, and at least two networked devices to be managed by the patroller through user interaction with the user interface on the client. In some embodiments, the external proxy may be operatively configured to perform some of the tasks required of the system, thereby reducing load on other parts of the system.

Embodiments may be configured such that the patroller may scan across a network to detect devices that are part of the network. The client may then virtualize those devices, receive user input related to the devices, and/or transmit control signals to the devices.

Accordingly, embodiments provide a method of virtualization, the method comprising communication between the client and the server, and updating of the user interface of the client in response to information received from the server. Multiple devices of different types and/or from multiple physical locations may be virtualized and/or accessed from one interface. Embodiments may also be configured with additional features such as grouping of ports across devices and/or creating schedules to power cycle the groups at specific dates and/or times.

The detailed description set forth below in connection with the appended drawings is intended as a description of various aspects of certain exemplary embodiments and is not intended to represent the only aspects of those embodiments. Each aspect described in this disclosure is provided merely as an example or illustration, and should not necessarily be construed as preferred or advantageous over other aspects.

The detailed description includes specific details for providing a thorough understanding of the present disclosure. However, it will be apparent to those skilled in the art that the present disclosure may be practiced without these specific details. Acronyms and other descriptive terminology may be used merely for convenience and/or clarity and are not intended to limit the scope of the present disclosure. Any steps in a method should not be construed as needing to be carried out in the order listed, unless stated otherwise.

In this Detailed Description, the term "may" generally refers to something that is possible or is permitted. In the following description, "virtualization environment" may refer to the screen or user interface of the client, or a portion of the screen or user interface. "Virtualizing" may refer to displaying, in the virtualization environment, information and/or controls related to the networked devices. Not all networked devices need to be virtualized, but the networked devices that are virtualized may be referred to as "virtualized devices." If not all of the networked devices are virtualized, then the "virtualized devices" may be a subset of the "networked devices." When a device is "virtualized," it may mean that the device is displayed in the virtualization environment, or that the device has been added to a group. The terms "virtualized device" and "networked device" may in some cases be used interchangeably, with the understanding that a "virtualized device" has already been virtualized. "Virtualizing" may also refer to the general concept of enabling, in a remote environment such as from a client, all the features and/or controls one would have when interacting directly with the device. "Virtualization" may refer to the concept of virtualizing devices, or it may refer to a specific instance of virtualizing devices in the virtualization environment.

Embodiments of the present disclosure relate generally to managing networks of electronic devices. Particular embodiments relate to simultaneously displaying multiple devices in a virtualization environment for easy visualization and/or control of the devices.

The virtualization may be displayed in many different ways so as to enable the control of multiple networked devices from one interface. In particular embodiments, the control may be performed from one screen. The networked devices may be of different types and/or may be located across multiple physical locations. The networked devices may be controlled in many different ways, such as by powering the device itself on or off, and/or powering specific ports on or off. Any variety of other features may be controlled, including, but not limited to, device firmware, configuration, categorization, permissions, and scheduling. This control may be achieved by sending control signals from the client to the devices. Control signals may be simply electronic signals through which the devices may be controlled.

A wide variety of electronic devices may be virtualized. As non-limiting examples, the devices may include routers, access points, controllers, and power devices such as power distributions units (PDUs) and power-over-ethernet (PoE) switches. Power devices generally have multiple ports that they may route power to. Consequently, each port of the power device may be controlled in the virtualization. In an exemplary embodiment, instead of power cycling an entire PDU, a user may choose to only power cycle one port of the PDU, thereby power cycling the device attached to that port. Power cycling refers to the concept of turning power off and then back on to effectively reset, restart, or reboot a device. Power cycling may also refer to powering a device on or off, and the powering on doesn't have to be immediately after the powering off. In some embodiments, a user may choose to power cycle multiple ports across multiple devices of different types. In other embodiments, the user may choose to power cycle the device itself.

The implementation of the virtualization and/or the user interface may differ across different contexts. Various features may be displayed on the same screen or on different screens. Embodiments may be configured for easy navigation and/or streamlined control. The virtualization itself may show multiple devices, along with relevant options, on one screen, and other devices on another screen. Other options may be located on different screens.

Figure 1:
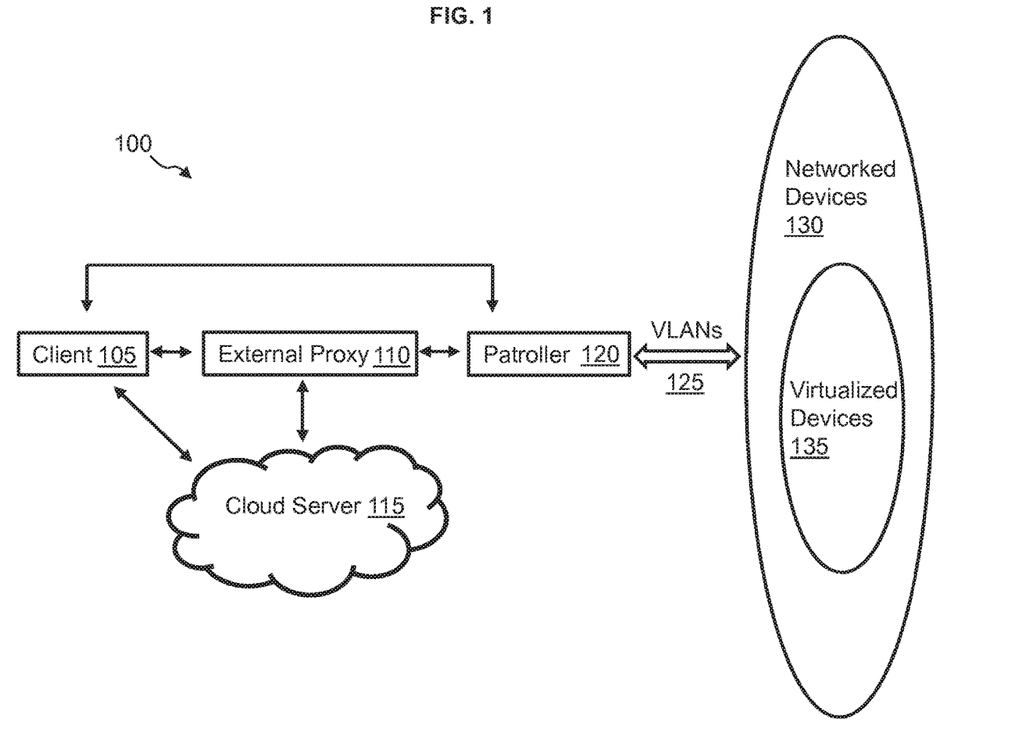
FIG. 1 is a chart showing exemplary communication between components of the cloud management system.

Referring to FIG. 1, in an exemplary embodiment, the cloud management system 100 may have a client 105, an external proxy 110, a cloud server 115, a patroller 120, and at least two networked devices 130. When a networked device 130 is virtualized, it may be referred to as a virtualized device 135. Not all networked devices 130 need to be virtualized, however, so the subset of virtualized devices 135 may be smaller than the total of networked devices 130. The client 105 may be any number of devices having a user interface and capable of communicating with the cloud server 115. As non-limiting examples, the client may be a computer or a smartphone.

In some embodiments, the system may use an external proxy 110 as another server onto which some tasks may be offloaded. Using a second server such as the external proxy 110 may increase performance of the system by reducing load on the cloud server 115. This may be accomplished by the external proxy 110 performing some of the tasks that the cloud server 115 might normally perform. In some embodiments, more than one external proxy 110 may be used.

In some embodiments, the client 105 may establish a connection with the external proxy 110 before the cloud server 115 may send or receive commands. The external proxy 110 may proxy connections as depicted in FIG. 1, between the client 105 and the cloud server 115, and between the cloud server 115 and the patroller 120. In some cases, the communication between the client 105 and the cloud server 115 and/or between the client 105 and the patroller 120 may not need to be proxied.

The cloud server 115 acts as a central location for storing information and/or facilitating communication between components of the cloud management system 100. The patroller 120 is a device that acts as a remote cloud server sitting directly on the network. When the cloud server 115 signals the external proxy 110 to open a connection to the patroller 120, the cloud functionality may be enabled. The patroller 120 may also communicate with and control networked devices 130 that are selected by the user to be managed by the patroller 120. The patroller 120 will be located on site, at a customer location, and therefore will have access to the local network. The cloud server 115 might not. Therefore, in an exemplary operation of an embodiment, the cloud server 115 may tell the patroller 120 what actions to perform.

The cloud management system 100 may be set up when a user uses a client 105 to create an account and register their patroller 120 with a cloud server 115. The user may input network information into the client 105, which would then use the patroller 120 to scan across the network. In some embodiments, the network information inputted may be VLAN information, and the patroller 120 would then scan across the VLANs 125 and search for networked devices 130 on those VLANs 125. In other embodiments, the network may be a LAN or another suitable network. After the scan, the networked devices 130 are identified, and information such as the hostname, IP address, VLAN 125 ID, and/or MAC address may be displayed and stored in a database on the cloud server 115. The scanned network devices 130 may be displayed to the user in the client 105 in a variety of manners. As non-limiting examples, they may be sorted by manufacturer and/or device type. The user may use the client 105 to add any of the found devices to a profile. The networked devices 130 added by the user will then be managed by the patroller 120. The user may create a virtualization from at least a portion of the networked devices 130, and these may be called virtualized devices 135. In this manner, the relationship between the client 105, the cloud server 115, the patroller 120, and the networked devices 130 is set up. The external proxy 110 may be used to proxy the communications in the cloud management system 100.

Once the cloud management system 100 has been set up, the networked devices 130 may be virtualized and/or controlled through the client 105. The user may connect directly to the network's management layer without the need for port forwarding or dynamic DNS service.

The user may use the client 105 to add devices to virtualization groups. These groups may display the status of and/or options related to multiple devices, thereby enabling the control of multiple networked devices 130 from a single user interface. To accomplish this control, the client 105 may send commands to the cloud server 115, and those commands may then be forwarded to and carried out by the patroller 120. The client 105 may create the virtualization and the patroller 120 may perform any interaction ordered by the client 105. The interaction may include, as non-limiting examples, power cycling, monitoring, creating schedules, and creating categories. This interaction may be done from anywhere in the world, from any web connected device.

In operation, the client 105 may send a signal to the cloud server 115 to detect the quantity of devices managed by the patroller 120. After the cloud server 115 signals the patroller 120 to scan across VLANs 125 and identify networked devices 130, the patroller 120 sends this information to the cloud server 115 and the cloud server 115 sends it to the client 105. The user may then specify if they want to group the networked devices 130, and the client 105 may send a signal to the cloud server 115 to make the association. As a non-limiting example, the signal may also comprise information such as the name the user wants to assign to the group. The cloud server 115 may store this information for later use. When the user has selected at least a portion of the networked devices 130 and grouped them, they may be called virtualized devices 135. The client 105 may continue receiving information such as port status, power consumption, and/or the like for the virtualized devices 135. After the networked devices 130 are grouped, the client 105 may interact with the cloud server 115 and/or the patroller 120 as needed. Automatic signals may be sent to request information such as port status. Manual signals may be sent to rename a group, power cycle a port, and/or the like. Alternatively, the communication between the client 105 and the networked devices 130 may occur without the need for creating a group of networked devices 130.

From the cloud server 115 side, the cloud server 115 may receive the signal from the client 105 to detect the quantity of networked devices 130. The signal may request information such as, but not limited to, IP addresses, MAC addresses, system uptime, and port status. The cloud server 115 may then query the networked devices 130, through the patroller 120 that has been registered with the cloud server 115, to get their status. Information received by the patroller 120 from the networked devices 130 may be stored on the cloud server 115 and may be sent to the client 105. The cloud server 115 may receive a signal from the client 105 to group at least a portion of the networked devices 130. The cloud server 115 may then create the grouping and store this information in a database. Once the cloud management system 100 has been set up according to this exemplary embodiment, the cloud server 115 may interact with the client 105 and/or the patroller 120 as needed.

Figure 2:
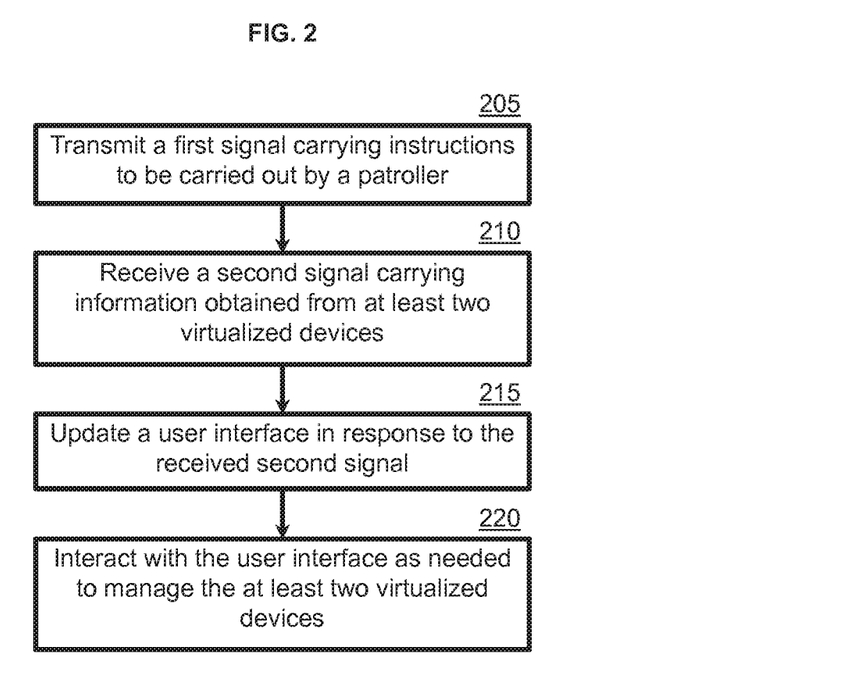
FIG. 2 is a chart describing an exemplary method.

Referring to FIG. 2, an exemplary method of managing virtualized devices 135 in a virtualization environment is shown. Step 205 may comprise transmitting a signal from the client 105 to the cloud server 115. The signal may include instructions to be carried out by the patroller 120, such that when the cloud server 115 signals the patroller 120, the patroller 120 will carry out the command initiated by the client 105. Step 210 may comprise the client 105 receiving, from the cloud server 115, a signal with information obtained from the virtualized devices 135. The signal may have information from at least one virtualized devices 135, but in the preferred embodiment the signal will have information from at least two virtualized devices 135. This information will have been obtained by the patroller 120 in communication with the virtualized devices 135 and forwarded to the cloud server 115. When the information from the virtualized devices 135 is received at the client 105, step 215 may comprise the client 105 updating a user interface in response to the received information. In such a manner, a user may interact with the user interface of the client 105 to control or manage the virtualized devices 135, as shown in step 220.

Figure 3:
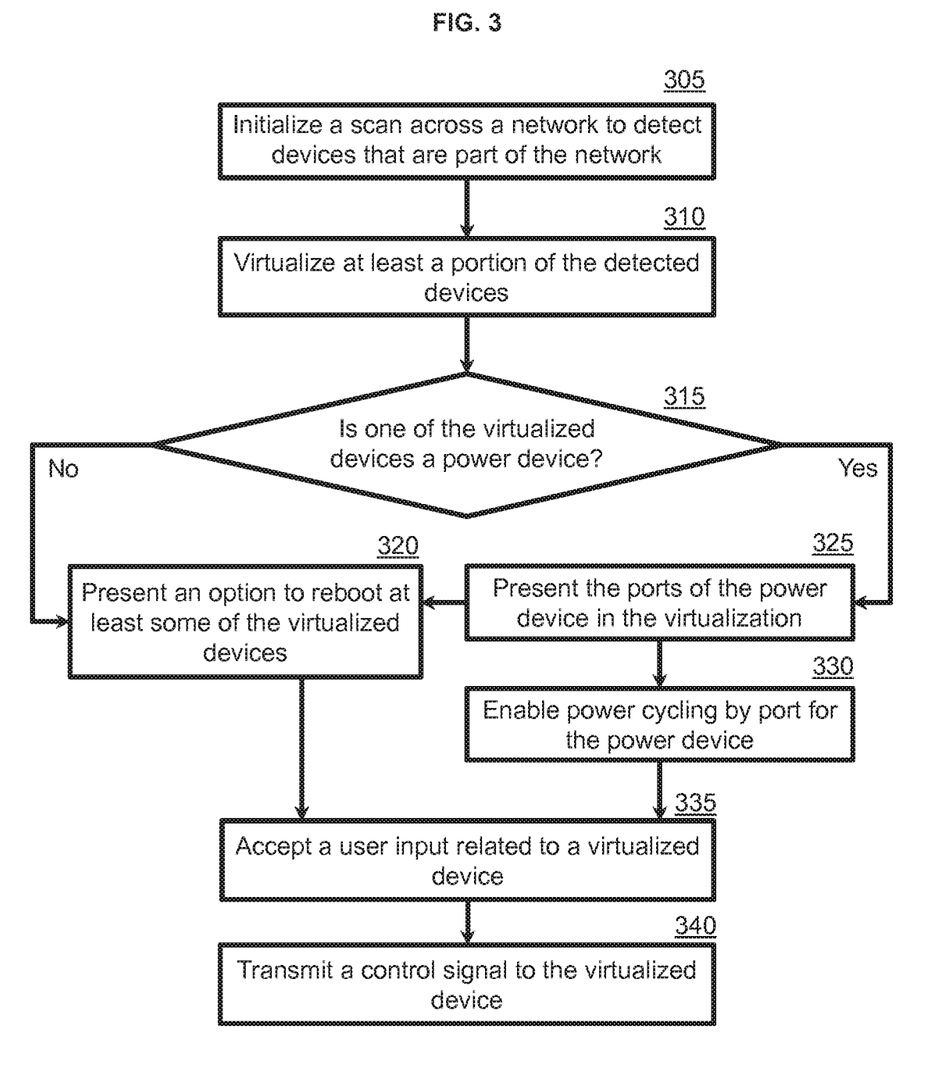
FIG. 3 is a chart describing an exemplary method.

Referring to FIG. 3, a preferred embodiment of an exemplary method of managing networked devices 130 in a virtualization environment is shown. Step 305 may comprise initializing, by the client 105, a scan across a network to detect networked devices 130. The scan may be performed by the patroller 120 across any appropriate network, such as a VLAN 125 or a LAN. Step 310 may comprise virtualizing, on the client 105, at least a portion of the detected networked devices 130. Not all of the networked devices 130 need to be virtualized, as not all of them may be desired to be controlled, viewed, and/or managed. Step 315 may comprise determining whether one of the virtualized devices 135 is a power device, such as a PDU or PoE switch. If none of the virtualized devices 135 are power devices, the user may be presented with an exemplary option of rebooting any of the virtualized devices 135, according to step 320. Other exemplary options may include, but are not limited to, accessing the device portal for the device or creating a lava tunnel.

A lava tunnel may allow the patroller 120 to open connections to the networked devices 130 on any port, using services such as Telnet, SSH, and RDP. If the virtualized device 135 has the capability, the device portal may be used to log into the device's native GUI. This may be accomplished without port forwarding or VPNs. From the native GUI, the user may see information about or control the virtualized device 135 at a more specific level. If at least one of the virtualized devices 135 is a power device, according to step 325, the user may additionally be presented with a graphical representation of the ports of the power device. In step 330, the cloud management system 100 may then enable power cycling of each port of the power device through interaction with the graphical representation. Consequently, the user may be presented with standard options such as rebooting the device, and may also be presented with options for specific control of each port of any virtualized power devices. In step 335, after the client 105 has created and displayed the virtualization, the client 105 may accept user input in the virtualization. In step 340, the client 105 may transmit a control signal to the virtualized device 135 corresponding to the user input in the virtualization. Exemplary control signals may include instructions to reboot the virtualized device 135, to power cycle a specific port of the virtualized device 135, or to categorize at least two virtualized devices 135 and manage them as a group. However, a variety of other control signals may also be transmitted.

Figure 4:
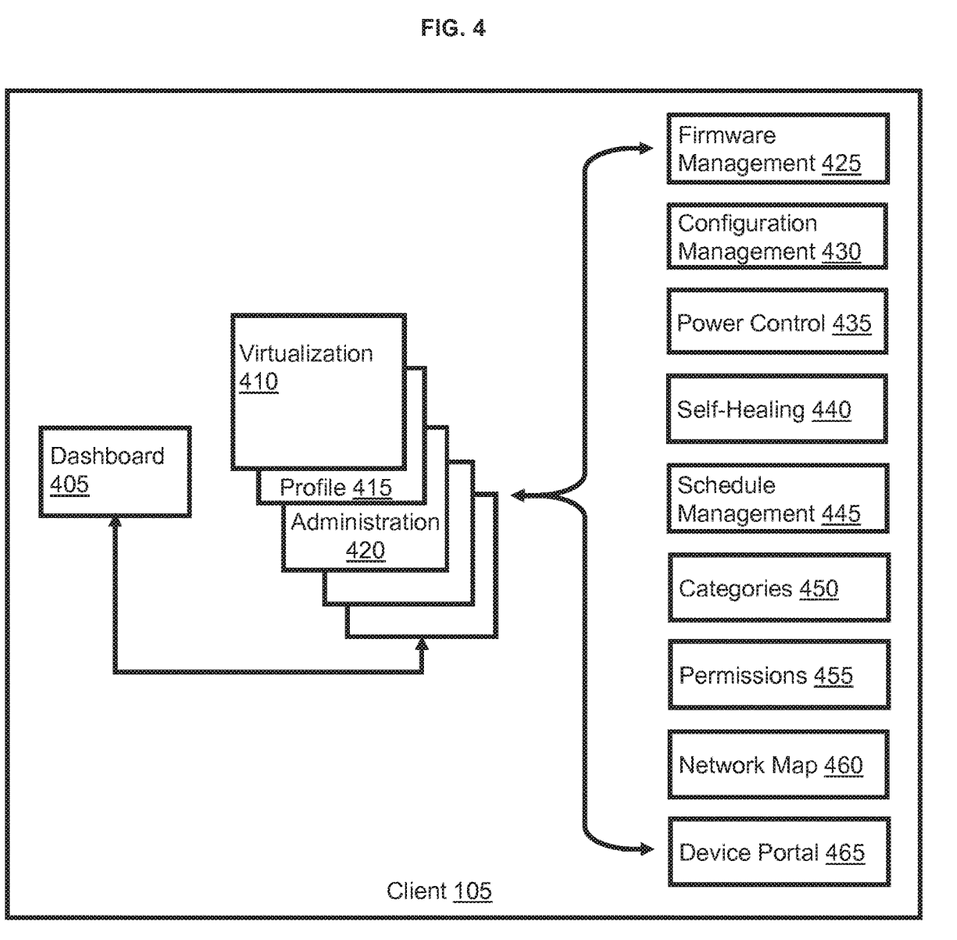
FIG. 4 shows exemplary features and display components of the client.

Referring to FIG. 4, exemplary features and display components of the client 105 are shown. For example, the client 105 may first present a dashboard 405 to the user when the user logs in to interact with the cloud management system 100. The dashboard 405 may link to a variety of pages. As a non-limiting example, the pages may include a Virtualization 410 page, a Profile 415 page, and an Administration 420 page. These pages may be interrelated and navigated between by any number of means. Exemplary modules of the cloud management system 100 may also be presented on some of these pages. The term "module" may refer to a feature or a function, and modules may be permanently built into a page, selectively enabled, or optionally built into the cloud management system 100 in a particular embodiment. For example, a Firmware Management 425 module may be displayed on the Virtualization 410 page. Other modules may also be displayed, such as Configuration Management 430, Power Control 435, Self-Healing 440, and/or Schedule Management 445. A variety of modules may be associated with a variety of pages, and consequently, the features and/or display components of the client 105 may be different across implementations.

On the Virtualization 410 page, many different kinds of functionality may be enabled. As a non-limiting example, power cycling, scheduling, configuration, and/or firmware updates may be enabled for all virtualized devices 135 in the network. The user may add any of the networked devices 130 to the virtualization. As a non-limiting example, the devices may include routers, power devices, access points, and any other devices that have configurations that may be backed up or restored, or devices that may accept firmware updates. When the user accesses the Virtualization 410 page, they may be presented with a list of profiles associated with various patrollers 120, and may then choose any networked devices 130 from among the profiles. To accomplish this, the cloud server 115 may send a command to the external proxy 110 asking it to open a connection with a patroller 120. The patroller 120 may send the cloud server 115 information on the networked devices 130 associated with the patroller 120. The cloud server 115 may then send this information to the client 105 to display all of the profiles to the user.

The term "profile" may refer to different customers at different physical locations. These physical locations may have their own patroller 120 managing the networked devices 130 for that particular profile. The user may choose networked devices 130 across the different physical locations and create a virtualization. The user may choose to create different types of virtualizations. As a non-limiting example, the types of virtualizations may be related to some of the modules described in more detail below, such as Firmware Management 425, Configuration Management 430, Power Control 435, Self-Healing 440, and/or Schedule Management 445. For example, a Firmware Management 425 module may allow a user to create a firmware management virtualization, through which the user may manage the firmware of the networked devices 130 in the virtualization. This may include viewing and/or updating the firmware of the devices in the virtualization. However, firmware management may also be performed for all networked devices 130, and not just virtualized devices 135.

On the Profile 415 page, exemplary modules may include a map module showing the physical location of each profile. The profile may represent a customer, and the customer may have a picture associated with their profile. An example picture may be the picture of the residence or the commercial space where the network is set up. This profile and picture may be incorporated into a marker which is placed in the map module. The marker may have an indicator such as a colored band around it. A red band may indicate that the network is down (or offline). An orange band may indicate that at least one device in the network is down. A green band may indicate that all devices in the network are up. The colored bands may be used in interfaces other than the map module. As a non-limiting example, they may also be used in a Network Map 460 module, or any other module. The Network Map 460 module is discussed below, and is different than the map module. Various symbols may be used in other modules as well. For example, the Power Control 435 module that may be located on the Virtualization 410 page may use different symbols as a port status indicator to indicate whether a port is active/powered or not.

On the Administration 420 page, exemplary modules may include a Permissions 455 module, and subscription and inventory management modules for managing patroller 120 licenses and the like.

A Firmware Management 425 module may allow a user to update the firmware of capable devices in the network. Capable devices may be devices from specific manufacturers. The devices do not need to be virtualized for the Firmware Management 425 module to be usable. In some embodiments, a user may create a category comprising any number of devices located across any number of physical locations. The locations may be separated by large geographic distances and need not be in the same room or building. As an example, the category may be called "Routers" and the user may add any router in the network to this category. The user may then specify when to check firmware, when to download firmware, and/or when to update firmware for the category. The Firmware Management 425 module may display which router in the category has which version of the firmware, so the user may see which one is up to date and which one is not. It may also display, for example, whether the category as a whole has up-to-date firmware, whether a schedule has been created to monitor the firmware for the category, and the like. At a particular specified time, the Firmware Management 425 module may push firmware simultaneously to all of the routers in the category. In some embodiments, the patroller 120 may periodically check the cloud server 115 for the latest firmware. This could happen once a day or any other interval. The patroller 120 may signal to the cloud server 115 asking for the latest firmware version for a particular virtualized device 135. If the firmware on the virtualized device 135 is outdated, the patroller 120 may send a request to the cloud server 115 to obtain the latest firmware, and the user may be notified through the client 105 of the availability of new firmware.

A Configuration Management 430 module may allow a user to manage the configuration of a particular virtualized device 135. However, the device does not need to be virtualized for the Configuration Management 430 module to be usable. An exemplary configuration may be the particular settings associated with a virtualized device 135. The user may create a category and add multiple devices from multiple physical locations to the category. The user may then apply one set of configurations to the category. Additionally, the user may back up the configurations of the virtualized devices 135 in the category at a location such as the cloud server 115. The user may also restore configurations to the category as needed, if for example, the devices in the category have been replaced. Alternatively, the user may have different configurations for all of the different virtualized devices 135. These configurations may be backed up in the same manner, and may also be restored in case a particular virtualized device 135 malfunctions and/or needs to be replaced or reset. In some embodiments, to backup the configurations of the virtualized devices 135, the external proxy 110 may signal the patroller 120 to connect to the virtualized devices 135 and run a command to download a configuration file. The configuration file may then be sent from the patroller 120 to the cloud server 115, where it may be stored and tagged with an ID to identify which configuration belongs to which device. To restore a configuration, the patroller 120 may request the configuration file for a specific virtualized device 135 from the cloud server 115. The cloud server 115 may send the file to the patroller 120 and then the patroller 120 may open a connection to the specific virtualized device 135 and upload the configuration file to the specific virtualized device 135.

A Power Control 435 module may allow a user to control features related to power for the virtualized devices 135. Exemplary features may include power cycling specific devices or ports. In an exemplary embodiment, a category may be created for power devices such as PDUs or PoE switches. The category may include power devices located at different physical locations. These devices may be virtualized and certain information related to the devices may be displayed. For example, when the user hovers over a port of the device, the information that may be displayed may include power consumption for the port, the device's mapping, and/or other information such as the current and/or voltage across the port. The user may choose which PDU or PoE switch ports to map to which device on the network. In some embodiments, the mapping may be automatic. Once mapped, the user may view the device, for example in a network map described below, and may be presented with an option to reboot the device. When that option is selected, the mapped port on the power device will be power cycled, thereby rebooting the device. A user may select multiple virtualized devices 135 that are part of the category to be able to view the ports of each virtualized device 135 on the same screen. The user may then view and control all selected devices from the category in one virtualization. If the user clicks on a port, exemplary options that may be displayed may include turning off the port, power cycling the port, mapping the port to a device, and removing the mapping. Additional features of the Power Control 435 module may include an option to reboot the virtualized device 135 if, for example, the virtualized device 135 is not a power device. As a non-limiting example, if the virtualized device 135 is a router, it may be rebooted either directly through a signal from the patroller 120, or indirectly by mapping of the router to a port of a power device. One or both of these options may be presented to the user in the virtualization.

A Self-Healing 445 module may allow a user to enable and control automatic ping and reboot functionality. In an exemplary embodiment, the Self-Healing 445 module may present the user with an option to specify any virtualized device 135 to ping at a particular time or a particular interval. If no response is received from the virtualized device 135 during a particular waiting period after the virtualized device 135 is pinged, the user may specify an exemplary instruction to reboot the virtualized device 135 a number of times up to a reboot limit. The user may also set a particular time frame for the self-healing instructions to be active, and/or may choose the option of receiving alerts related to the self-healing of a particular device. An exemplary alert may be one that is sent out whenever a particular port is power cycled. The Self-Healing 445 module may help ensure total uptime of the virtualized devices 135 while simultaneously keeping users aware of any network issues.

A Schedule Management 445 module may allow the user to create schedules for any of the virtualized devices 135. The schedules may also be created for categories of devices, as described below. Some non-limiting examples of things that may be scheduled may include firmware updates, configuration updates, power controls, and self-healing timings. For example, the user may create a schedule to download and/or install the latest firmware, to restore or backup device configurations, or to power cycle ports at specific times. An exemplary schedule may be created by specifying a port, a schedule name, a schedule option, a day, and a time. Schedule options may include, but are not limited to, power cycling, updating firmware, and backing up configurations. The power cycling option may be set to reboot a virtualized device 135 at a particular time, or it may be set to power a device on or off at particular times. The schedules may be displayed by any number of means. In some embodiments, the schedule may be in tabular form with different days as the columns and different devices as the rows. Each cell of the table may be populated with a schedule to perform a specific action at a specific time. Actions may be performed on individual virtualized devices 135 or on categories of devices.

A Categories 450 module may allow a user to categorize networked devices 130 and manage them as a group. In an exemplary configuration of the cloud management system 100, to create a category, the client 105 may receive information on the networked devices 130 from the patroller 120, and the user may choose any number of networked devices 130 to add to the category. Alternatively, the cloud server 115 may store information for devices from different physical locations. These devices may be managed by different patrollers 120. The client 105 may ask the cloud server 115 to provide a list of physical locations. Once the list of physical locations is available, the client 105 may send a command through the cloud server 115 to the different patrollers 120 to display all the networked devices 130 at those locations. The user may then pick which networked device 130 they want to add to the category. The category will be created and all of the networked devices 130 that the user selected will be in the category. Alternatively, the devices selected to be added to the category may have already previously been virtualized. In a non-limiting example, the user may pick any number of ports among the different virtualized devices 135 in the virtualization, group them into categories, and then create schedules for each category. The schedule would apply to all of the devices in the category. As described above, the scheduling may be performed using a Schedule Management 445 module. In an exemplary embodiment, if a user has Christmas lights connected to different ports on three different PDUs, they may turn ON/OFF the lights simultaneously by using a category created with the Categories 450 module instead of having to go to each specific port on each PDU to power cycle it individually.

The cloud management system 100 may enable different kinds of access for different kinds of users. A customer may be a user who has purchased a patroller 120 and/or is using the cloud management system 100 to control networked device 130 on their network. A dealer may be a user who sells patrollers 120. A network technician may be a user who monitors the networked devices 130 to make sure they are functioning properly or that the network itself is functioning property. A Permissions 455 module may be displayed on the Administration 420 page, where a user that is a dealer (or in some embodiments, other users) may be allowed to control the permissions given to network technicians. The dealer may create an account for a network technician, and then assign the network technician to a group of customers. The customers may each have their own network of devices that may be managed by the network technician. The dealer may create network technician groups, and may specify detailed permissions for each network technician or network technician group. As a non-limiting example, the dealer may specify that a particular network technician may only power cycle two particular ports for a particular device of a particular customer.

Permissions may be assigned in a variety of ways. As non-limiting examples, they may be assigned by groups of technicians, groups of customer, groups of patrollers, and/or may be assigned specifically by device and/or by port. In some embodiments, a group of network technicians may be assigned to a particular patroller 120 to manage the devices associated with that patroller 120. Alternatively, a specific network technician may be selected, so as to enable assignment of his or her permissions specifically. Different types of permissions may be assigned to the specific network technician, including, but not limited to, global permissions, group permissions, patroller permissions, device permissions, and port permissions. The specific network technician may be part of a technician group, assigned to a particular patroller, and/or assigned to a particular device. The dealer may choose to allow or deny the technician permission to perform various tasks, such as rebooting routers, creating network maps, removing or adding devices, and/or controlling alerts and/or notifications. Additionally, the dealer may choose to allow the technician the same permissions as another technician, for example a parent technician. In one embodiment, global permissions may apply to every patroller that a technician is assigned to. In another embodiment, group permissions may also be used. In that case, the permissions would be for the group that the technician belongs to.

A Network Map 460 module may present networked devices 130 in a network map, such that the user may see in a graphical representation, for example, what power devices are connected to a patroller 120, and what other devices are connected to the power devices. Generally, the network map may show the connectivity of the networked devices 130. In some embodiments, this may be done with a tree structure. The tree structure may display, for example, multiple devices connected to one switch. Exemplary information that may be displayed in the network map may include, as a non-limiting example, device name, IP, model, and manufacturer.

A Device Portal 465 module may, in some embodiments, enable the user to access the native device GUI of any virtualized device 135. As a non-limiting example, the Device Portal 465 module may be presented as an option on the Virtualization 410 page or on the Profile 415 page in relation to any virtualized device 135 listed on these pages.

Figure 5:
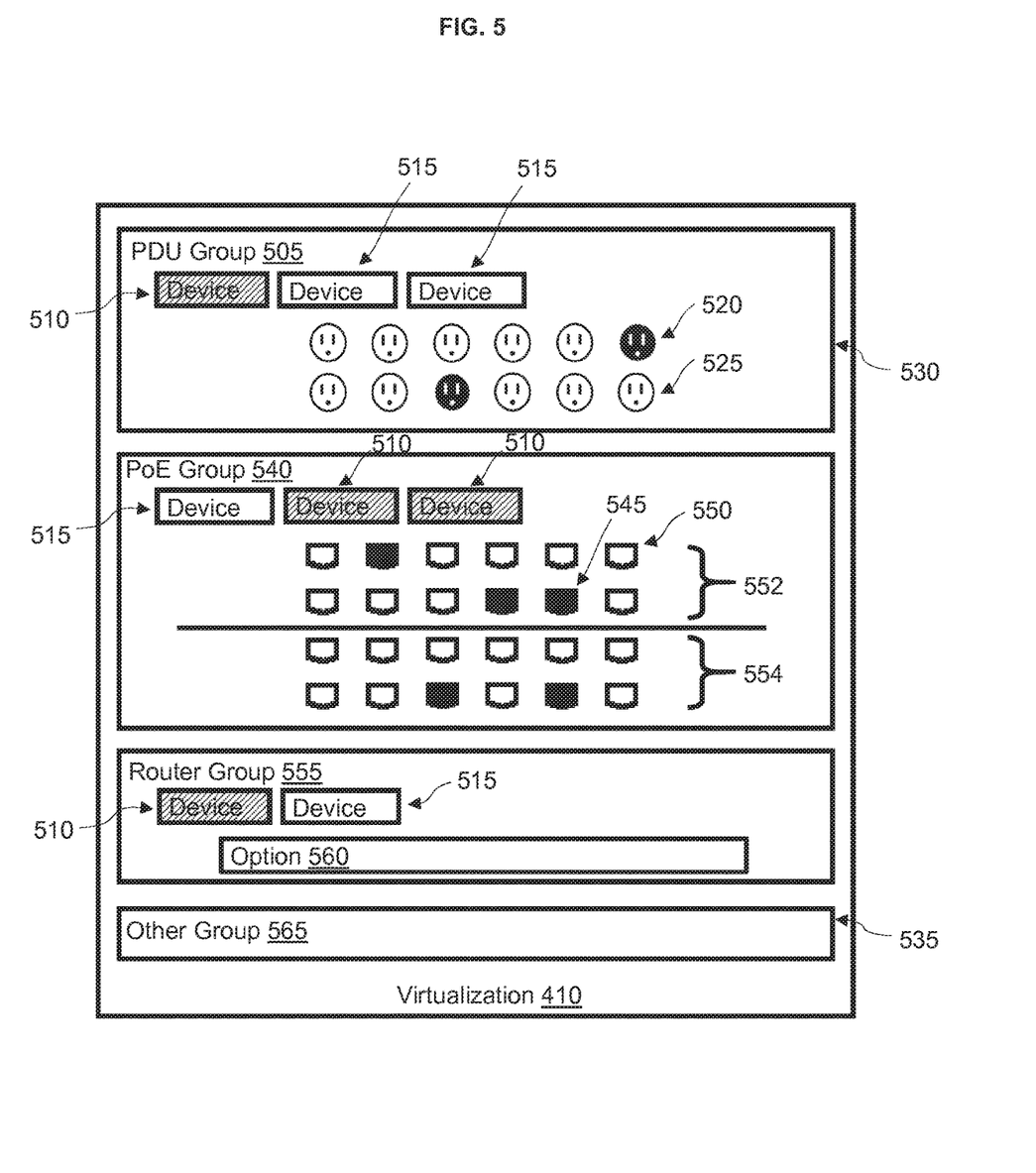
FIG. 5 shows an exemplary virtualization.

Referring to FIG. 5, an exemplary Virtualization 410 page layout is shown. In the present embodiment, an exemplary page is shown for a power control virtualization enabled by a Power Control 435 module. Virtualizations using other modules, or even the Power Control 435 module, may look different in other embodiments. In FIG. 5, the virtualization may have a PDU Group 505, a PoE Group 540, a Router Group 555, and an Other Group 565. The devices in any of the groups, such as the PDU Group 505 or PoE Group 540, may be located at different physical locations, but may all still be controlled in the same virtualization environment. When a group such as the PDU Group 505 is selected, the client 105 may display an expanded view 530 of the PDU Group 505. The expanded view 530 may display more information and/or options to the user than an unexpanded view 535.

The PDU Group 505 may consist of a number of PDU devices added to the PDU virtualization. A selected device 510 may be one such device. When it is selected, its information may be displayed as part of the PDU Group 505. For example, the ports of the PDU may be displayed in the group, so as to enable the user to interact with the particular ports of the selected device 510. An unselected device 515 may also be part of the PDU Group 505, but in the present embodiment, the ports of the unselected device 515 may not be displayed to the user. For the selected device 510, various information may be displayed. As a non-limiting example, an active PDU port 520 may be displayed with a colored graphic, and/or an inactive PDU port 525 may be displayed with an uncolored graphic.

The PoE Group 540 may consist of a number of PoE switches added to the PoE virtualization. If there are multiple selected devices 510, a graphical representation may be shown for each device. In the exemplary embodiment, the virtualization may display a first graphical representation 552 for a first selected PoE switch, and below it a second graphical representation 554 for a second selected PoE switch. In this exemplary manner, the user may be presented with a virtualization of multiple devices in the same interface, thus enabling their control and/or management from one interface. The user may control one or more devices from the PDU Group 505, one or more devices from the PoE Group 540, and/or a number of other devices that may be displayed in the same interface. For the PoE Group 540, an active PoE port 545 may be displayed with a different colored graphic, and/or an inactive PoE port 550 may be displayed with a different uncolored graphic.

The Router Group 555 may consist of a number of router devices added to the router virtualization. When a router is selected, the user may be presented with an Option 560. An exemplary Option 560 may be an option to reboot the router. The Other Group 565 may consist of other devices which may be added to the virtualization. An exemplary option for a device in the Other Group 565 may also be to reboot the device. However, in an unexpanded view 535, this option might not be displayed.

In the Virtualization 410 page, some of the exemplary options for the virtualized devices 135 may include power cycling the virtualized devices 135, power cycling specific ports of the virtualized devices 135, creating schedules to perform various functions at specified times, and/or programming self-healing instructions for the virtualized devices 135 or specific ports of the virtualized devices 135. Exemplary information that may be displayed about the virtualized devices 135 may include, for example when a port is hovered over, power consumption, current, and/or voltage information.

Figure 6:
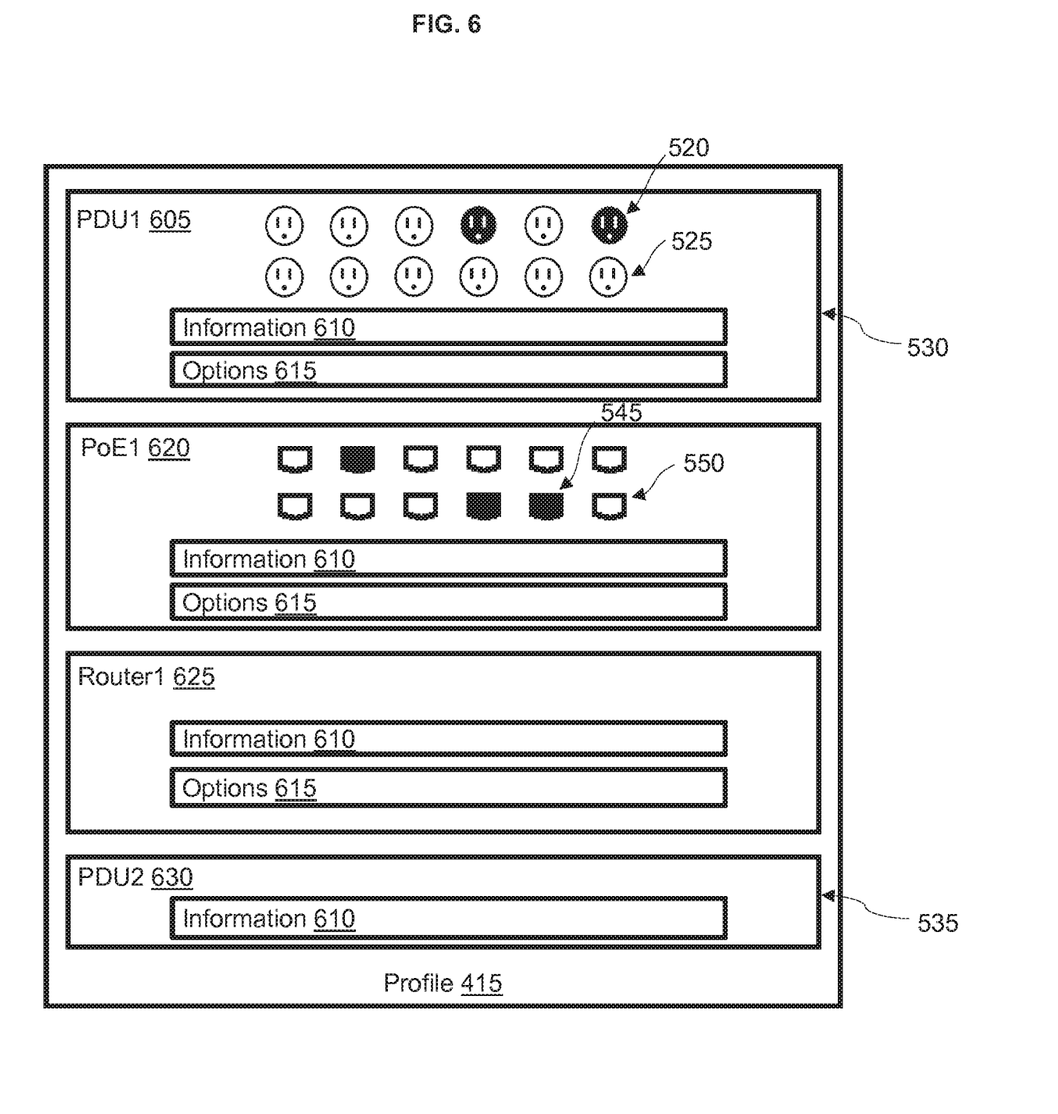
FIG. 6 shows exemplary virtualized devices with various features, information, and options.

Referring to FIG. 6, an exemplary Profile 415 page layout is shown. This page may list all of the virtualized devices 135 that are part of a profile, and thus that are associated with a particular patroller 120. In the present embodiment, the profile has a PDU1 605 device, a PoE1 620 device, a Router1 625 device, and a PDU2 630 device. In an exemplary embodiment, when a virtualized device 135 is hovered over, the user may be shown the status of the virtualized device 135. The user may also be shown other information and/or options, such as action that needs to be taken for the device, an option to remove the virtualized device 135 from the profile, and the like. These devices may be viewed in an expanded view 530 or in an unexpanded view 535. The expanded view 530 may present more information to the user, such as a graphical representation of all ports of any power device, and/or Information 610 and/or Options 615. In the unexpanded view 535, the user might only be presented with Information 610. All of this and the following information may also be presented to the user in the Virtualization 410 page. As in the Virtualization 410 page, the user may manage and/or control the devices, and may view related information. In an exemplary embodiment, the Information 610 that may be displayed to the user may include hardware information related to the particular device, such as its IP address, model name, and/or MAC address. It may also include information on whether the device is online or offline.

Some of the graphical information that may be presented in the expanded view 530 may include a particular graphic for each of an active PDU port 520, an inactive PDU port 525, an active PoE port 545, and/or an inactive PoE port 550. Additionally, the PoE ports may have some kind of indicator, such as a color indicator, indicating whether the port is passing only data or both data and power. Other information which may be presented may include an indicator showing which VLAN a particular port belongs to. In addition to the port-related options that may be presented, exemplary Options 615 may include an option to reboot the device, an option to access the native device GUI through a Device Portal 465, and a lava tunnel option.

Figure 7:
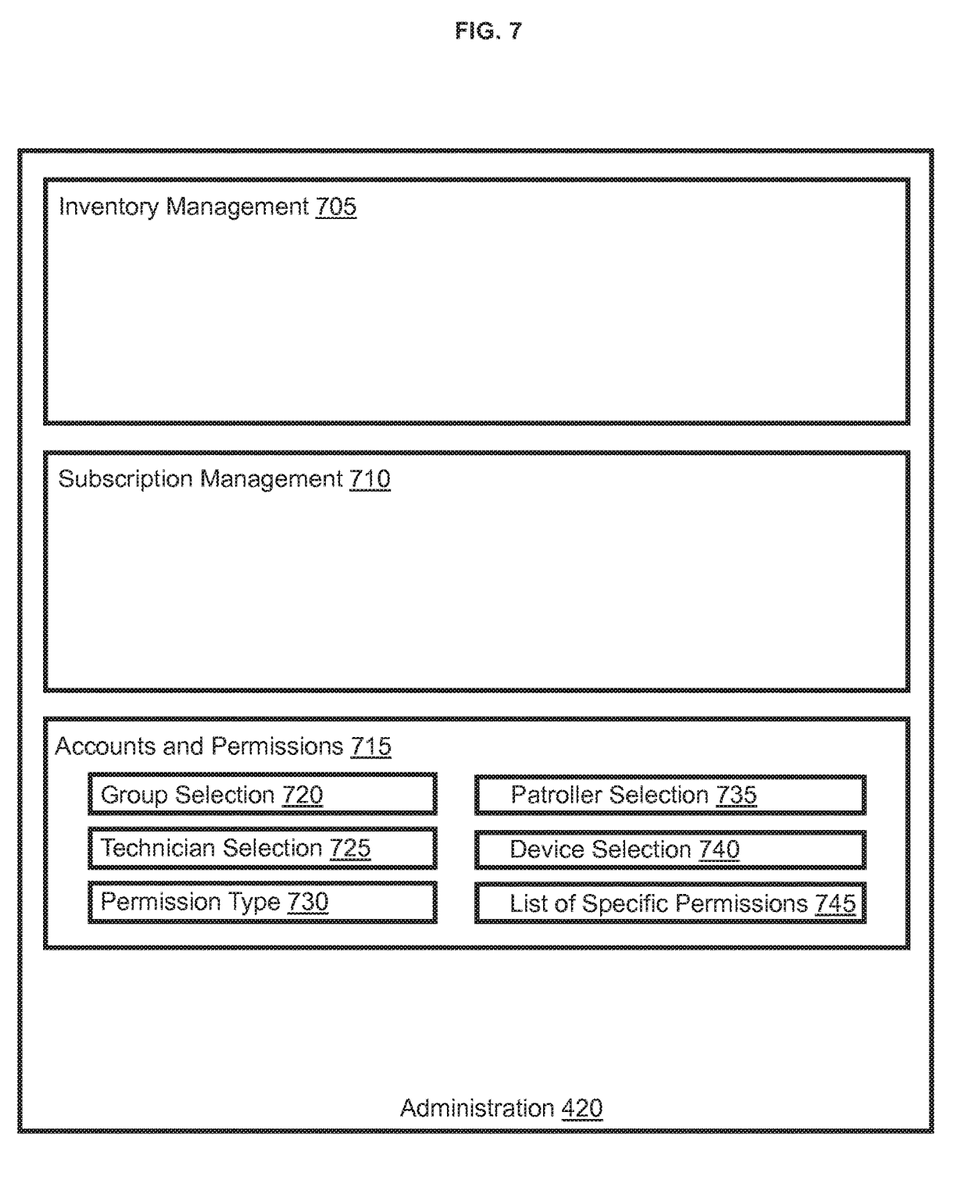
FIG. 7 shows an exemplary administration screen layout.

Referring to FIG. 7, an exemplary Administration 420 page layout is shown. This page may have an Inventory Management 705 option and/or a Subscription management 710 option. These options may be used, for example, to manage licenses for the patrollers 120. In an exemplary embodiment, The Administration 420 page may also incorporate the Permissions 455 module, which is described above. The Permissions 455 module may be incorporated into an Accounts and Permissions 715 option. The Accounts and Permissions 715 option may further have options related to Group Selection 720, Technician Selection 725, Permission Type 730, Patroller Selection 735, Device Selection 740, and/or List of Specific Permissions 745. As in the Permissions 455 module, the user may make any number of selections and/or specifications using these options, thereby enabling a network technician or other user to perform particular actions on particular devices.

What is claimed is:

1. A method for controlling network connected devices using communications among a client device, a server device belonging to a cloud network, a patroller device belonging to a customer-site local area network (LAN), and any number of customer-site LAN connected devices, the method comprising:

transmitting, from the client device to the patroller device over a network connection provided by a proxy device proxying communications between: (1) the server device belonging to the cloud network, (2) the client device, and (3) the patroller device connected to and disposed at the customer-site LAN, a first message including information commanding the patroller device to perform a scan across the customer-site LAN for detecting the customer-site LAN connected devices;

receiving, by the client device from the patroller device via the network connection provided by the proxy device, a second message including scan information associated with the detected customer-site LAN connected devices, wherein the scan information indicates respective network address of the detected customer-site LAN connected devices;

virtualizing, by the client device, at least two of the detected customer-site LAN connected devices, the virtualizing comprising:

displaying, on a display device associated with the client device, a virtualization environment that is part of a user interface (UI) of the client device, the virtualization environment including graphical representations of each of the at least two detected devices for indicating to a user of the client device the scan information received from the patroller device; and receiving, from the user via the virtualization environment that is part of the UI, a user input related to at least one of the at least two detected devices; and transmitting a control signal to the at least one of the detected customer-site LAN connected devices corresponding to the user input.

2. The method of claim 1, wherein at least one of the virtualized devices is a different type of device than another of the virtualized devices.

3. The method of claim 2, wherein the at least one of the virtualized device is at least one of a router, an access point, and a power device.

4. The method of claim 1, wherein the control signal comprises a power cycling instruction.

5. The method of claim 1, wherein at least of one of the at least two detected devices is a power device, and wherein the graphical representation comprises a port status indicator for each port of the power device.

* * * * *